United States Patent [19]

Boots

[11] Patent Number: 4,678,228
[45] Date of Patent: Jul. 7, 1987

[54] SLIDING ROOF FOR A VEHICLE

[75] Inventor: Robert T. Boots, Haarlem, Netherlands

[73] Assignee: Vermeulen-Hollandia Octrooien II B.V., Netherlands

[21] Appl. No.: 800,051

[22] Filed: Nov. 20, 1985

[30] Foreign Application Priority Data

Dec. 6, 1984 [NL] Netherlands .................. 8403710

[51] Int. Cl.$^4$ .................. B60J 7/047; B60J 7/185
[52] U.S. Cl. .................. 296/216; 296/220; 296/223; 296/224
[58] Field of Search .................. 296/216, 220–224

[56] References Cited

U.S. PATENT DOCUMENTS 4,407,541  10/1983  Boots .................. 296/216

FOREIGN PATENT DOCUMENTS 0143589  6/1985  European Pat. Off. ......... 296/223
3308822  9/1984  Fed. Rep. of Germany ...... 296/222
2114212  8/1983  United Kingdom ............ 296/222

*Primary Examiner*—Robert B. Reeves
*Assistant Examiner*—Dennis H. Pedder
*Attorney, Agent, or Firm*—Kinney & Lange

[57] ABSTRACT

The invention relates to a sliding roof for a vehicle, comprising a panel, which in its forward position closes an opening in the fixed roof and which, upon operation of an actuating member, raises its rear edge and is partly displaceable outside the roof opening into positions above the fixed roof, the panel being pivotable about a horizontal transverse shaft and being supported near its front edge by at least one front support, which is movable backwardly and forwardly in the longitudinal direction of the vehicle. A lever is pivotally mounted at its lower end with respect to the vehicle and has at least three guide elements formed on its upper end including a pin that is slidably mounted in a first longitudinally extending slot formed underneath the panel, and a protrusion that extends from an opposite side of the lever from the pin which is mounted in a second slot also formed underneath to the panel. The protrusion acts as a latch with respect to a pin that is fixed in the second slot, and the protrusion, which is permanently mounted in the second slot, moves to a position to release the latch and permit the panel to slide rearwardly after the lever has pivoted to a selected position as the front support is moved rearwardly. The panel is held securely throughout its movement by at least two elements.

10 Claims, 8 Drawing Figures

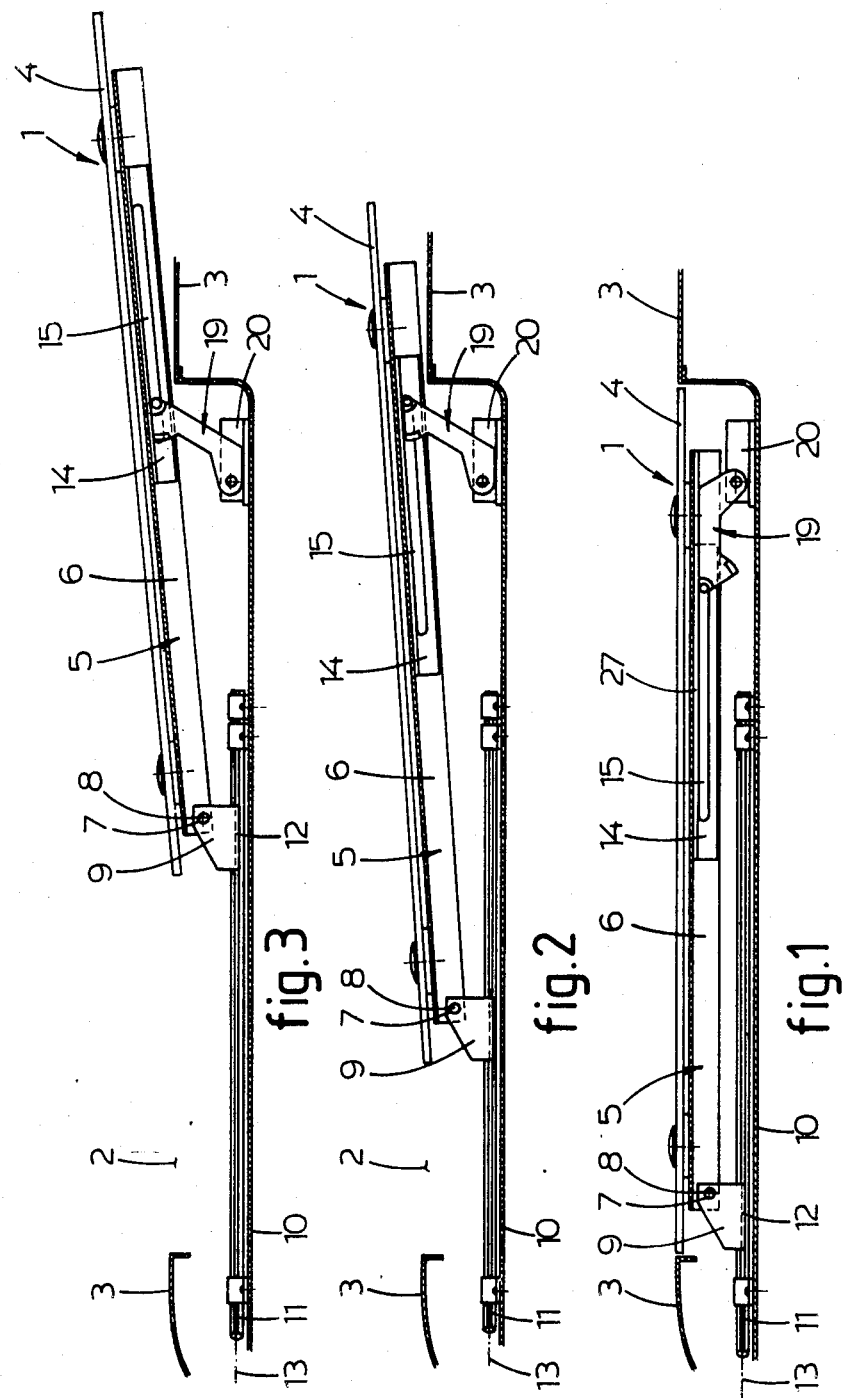

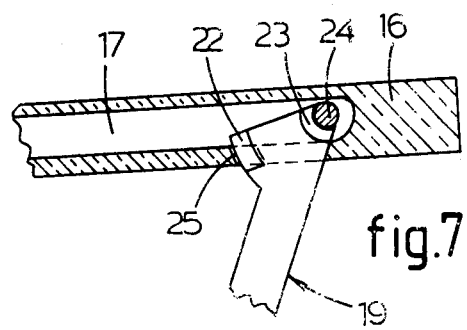
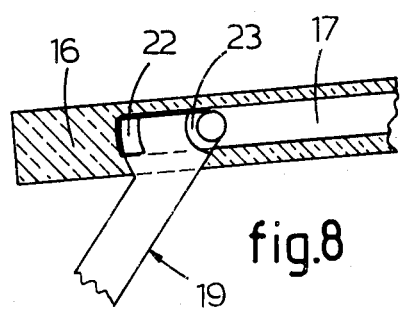
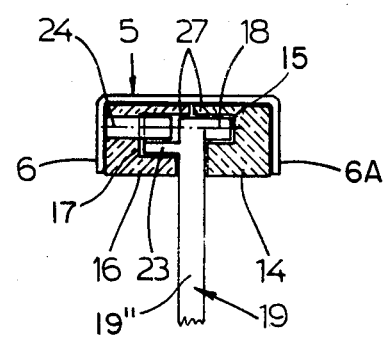
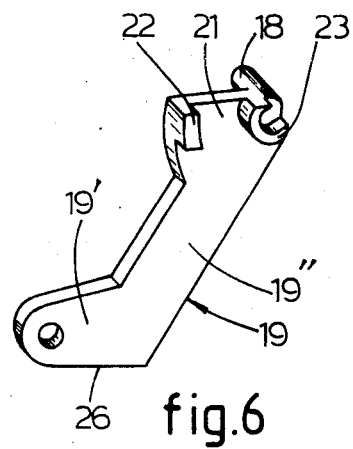
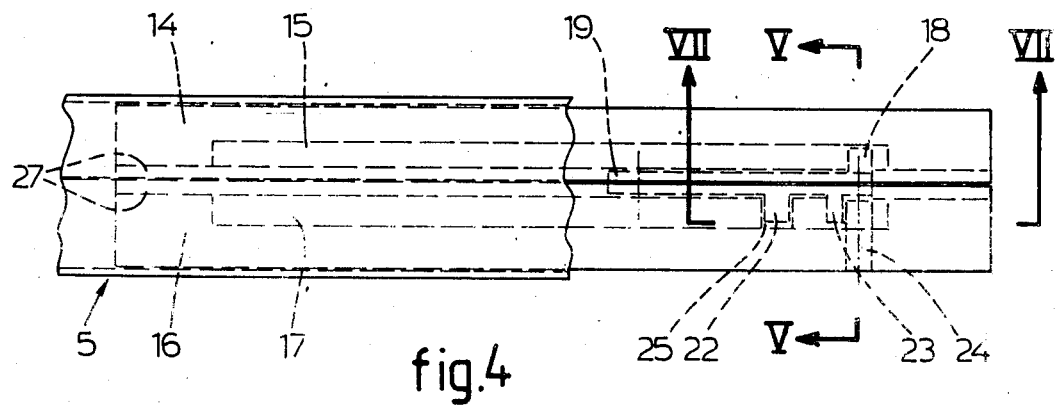

SLIDING ROOF FOR A VEHICLE

The invention relates to a sliding roof for a vehicle, comprising a panel, which in its forward position closes an opening in the fixed roof and which, upon operation of an actuating member, raises its rear edge and is partly displaceable outside the roof opening into positions above the fixed roof, the panel being pivotable about a horizontal transverse shaft and being supported near its front edge by at least one front support, which is movable backwardly and forwardly in the longitudinal direction of the vehicle, backwardly of the (each) front support, the panel pivotally engages a transverse pin at the upper end of a lever, which is supported at its lower end and is pivotable about a horizontal transverse axis of rotation, whilst at the upper end of the lever at least two further guide elements are formed, the transverse pin being slidable in a slot formed underneath the panel, the lever upon displacement of the panel from the forward position, reaching a position, which is defined by a step, whereupon the transverse pin passes the slot; and vice versa.

In a known embodiment of such a sliding roof the lever is provided with a guide slot and a guide pin in addition to the transverse pin, wherein during the pivoting movement of the lever the guide slot fittingly co-operates with a guide pin connected to the section, and when the transverse pin of the lever passes through the slot underneath the panel the guide pin of the lever engages in a guide section formed underneath the panel in order to prevent the panel, when in its fully or partly opened position from rattling under the influence of roughness of the road surface.

However, during the transition of these both engagements the lever is connected to the panel only by means of the transverse pin, whereby this connection at least in course of time will no longer be free from play, so that the panel in this position as yet may start rattling.

It is an object of the present invention to provide a sliding roof of the type mentioned hereinbefore, in which this disadvantage is removed in an efficient way.

For this purpose the sliding roof according to the invention is characterized in that any position of the panel at least one of the guide elements on the lever is in fitting engagement with a co-operating element carried by the panel.

As a result of this permanent multiple engagement between the lever and the panel, a rattling of the panel under influence of roughnesses of the road surface is prevented.

The invention will hereinafter be elucidated with reference to the drawings, which show an embodiment of a sliding roof according to the invention by way of example.

FIG. 1 is a longitudinal section of an embodiment of the sliding roof according to the invention, wherein the panel is in the closed position.

FIG. 2 is a longitudinal section corresponding to FIG. 1, wherein, however, the panel is shown in an intermediate position.

FIG. 3 is a longitudinal section corresponding to FIG. 1, wherein, however, the panel is in the rear end position.

FIG. 4 is a partial view of the sliding roof in the position of FIG. 2, wherein parts are omitted in order to show underlying parts.

FIG. 5 is a section along the line V—V in FIG. 4.

FIG. 6 is a perspective view of the lever of the sliding roof of FIG. 1.

FIG. 7 is a section along the line VII—VII in FIG. 4.

FIG. 8 is a section corresponding to FIG. 7, wherein, however, the panel is in the rear end position.

The drawings show an embodiment of a sliding roof for a vehicle by way of example, comprising a panel 1, which in its forward position closes an opening 2 in the fixed roof 3 and which, upon raising its rear edge 4, may be displaced rearwardly into an oblique position partly outside the roof opening 2 into positions above the fixed roof 3.

To this end, in the first place an U-section 5 extending in the longitudinal direction of the vehicle is mounted on either side underneath the panel 1 in such way, that the legs 6, 6A thereof extend downwardly.

In the embodiment shown in the drawing by way of example always only the U-section 5 disposed at one side of the vehicle, as well as the co-operating elements necessary for the adjustment of the panel 1 and described hereinafter are illustrated, wherein, however, it is to be understood that in general at the other side of the vehicle corresponding elements are used, which form the mirror image of the elements shown in the drawings.

The legs 6, 6A of the U-section 5 are each provided with a hole 7 at their front ends, the holes 7 being in alignment with each other. A transverse pivot shaft 8 engages in the respective hole 7, each pivot shaft 8 being connected to a front support 9, which can be moved along a respective hollow guide rod 11 extending in the longitudinal direction of the vehicle and supported by a gutter-like depression of a mounting frame 10.

Each hollow guide rod 11 has a longitudinal slot, through which a lip 12 of the co-operating support 9 protrudes inwardly.

An actuating member (not shown) is rotatably mounted on the mounting frame 10 and, upon rotation, actuates a drive wheel, which engages two flexible push-pull cables 13. At either side of the vehicle one of the hollow guide rods 11 extends to the actuating member and guides one of the flexible push-pull means 13, which with its end engages the lip 12 of the respective front support 9.

The one leg 6A of the U-section 5 carries a plastic portion 14, in which a longitudinal slot 15 is formed, while on the other leg 6 a plastic portion 16 with a slot 17 is mounted. The slots 15 and 17 have different transverse sections, but extend parallel to each other, while they have the same reach in the forward and rearward direction (see FIG. 4 and FIG. 5).

A transverse pin 18 is slidably and rotatably accommodated in the slot 15, which transverse pin 18 is formed at the upper end of a lever 19, which at its lower end is freely pivotally supported by a support section 20 mounted in the gutter-like depression of the mounting frame 10. The axis of rotation of both levers 19 are in alignment with each other and extend horizontally in the transverse direction of the vehicle.

Each lever 19 comprises an enlarged head 21 at the end provided with the transverse pin 18, to which head 21 a guide cam 22 is formed at the other side from the transverse pin 18, wherein the guide cam 22 co-operates with the slot 17 and is fittingly accommodated therein. Each guide cam 22 is positioned on the side of the enlarged head 21 that is the front side in the rear position of the respective lever 19.

Furthermore, the lever 19 is provided with a protrusion 23 formed on the enlarged head 21, the protrusion 23 being substantially in alignment with the transverse pin 18 at the other side of the lever 19 and fittingly protruding in the slot 17.

The protrusion 23 has the configuration of a circular curved wall, which extends about an angle of at most 180°, wherein the inner side of the curved wall can fittingly engage a transverse latch pin 24 fixed to the plastic part 16 near the rear end of the slot 17. The center of curvature of the circular curved wall of the protrusion 23 lies on the center line of the transverse pin 18 of the lever 19.

During the pivoting movement of the lever 19 the protrusion 23 rotates about the latch pin 24 in the slot 17, wherein the latch pin 24 is placed at such a distance from the rear wall of the slot 17, that during the rotation of the protrusion 23 about the latch pin 24 the curved wall of the protrusion 23 is fittingly accommodated between the latch pin 24 and the rear wall of the slot 17.

A rearward displacement of the panel 1 from the front or closed position as shown in FIG. 1 is obtained by rotating the actuating member in such sense that the flexible push-pull cable 13 moves the respective front support 9 in the rearward direction along the hollow guide rods 11.

During this displacement the transverse pin 18 remains in engagement with the rear end of the slot 15, because the protrusion 23 lies between the latch pin 24 and the rear wall of the slot 17 and is therefore locked against a sliding movement, and the lever 19 pivots upwardly and thereupon beyond its vertical position downwardly again, while the protrusion 23 rotates about the retarding pin 24, and during the last part of the pivoting movement the guide cam 22 enters the slot 17 through an opening 25 at the lower side of the plastic portion 16.

The lever 19 is formed in such a way, that two portions 19' and 19" are obtained, which make an angle with respect to each other, the edge of the lower portion 19' which forms the lower edge of the lever 19 in the rearward position of the lever 19, serving as a stop 26, when it comes into engagement with the bottom of the section 20 (FIG. 2).

Shortly before the end of the pivoting movement of the lever 19 the protrusion 23 lies at the front side of the latch pin 24 and the lock against sliding movement is released. However, at this time the front side of the guide cam 22 has come into engagement with the front side of the opening 25 in the plastic portion 16 and in this way a lock against a sliding movement of the panel 1 is obtained until the end of the pivoting movement of the lever 19 (FIG. 7).

When the front supports 9 are displaced further backwardly along the hollow guide rods 11 by means of the flexible push-pull cables 13 the transverse pin 18 will pass through the slot 15, while the guide cam 22 and the protrusion 23 are fittingly moved in the slot 17. After the guide cam 22 has reached the front end of the slot 17 no further backward displacement of the panel 1 is possible and therefore this panel 1 has reached its rear end position (FIG. 3 and FIG. 8).

In order to move the panel 1 forwardly again towards its closed position, the actuating member is rotated in the opposite sense, so that the flexible push-pull cable 13 pulls the respective front support 8 forwardly, whereby the transverse pin 18 slides along the slot 15, while the guide cam 22 and the protrusion 23 move through the slot 17, and thereupon the lever 19 is pivoted forwardly, because the protrusion 23 has come into engagement with the latch pin 24 (FIG. 4), so the lever cannot move farther along the slot 17. As lever 19 pivots the guide cam 22 is guided through the opening 25 to a position out of the slot 17 (FIG. 7).

The closed position of the panel 1 is reached when the edge of the lever portion 19", which in the forwardly inclined position of the lever 19 forms the upper edge of this lever comes into engagement with the longitudinal ribs 27, 27 which are formed near the upper edges of the plastic portions 14, 16 respectively (FIG. 1) and on the sides of the plastic portions or blocks that face each other and are spaced apart to define a slot for lever 19. The ribs 27, 27 are positiond above the slot 15 and 17, respectively, and the respective plastic portion or block. The positioning of the ribs 27, 27 can be seen in FIG. 5.

According to the invention on both sides of the panel 1 the transverse pin 18 is permanently in fitting engagement with the slot 15 and the protrusion 23 is permanently in fitting engagement with the slot 17, while in the rearward positions of the panel 1 (positions between those of FIG. 2 and FIG. 3) the guide cam 22 also cooperates fittingly with the slot 17, so that in any position of the panel 1, including near the transition of the pivoting and sliding movement of the panel 1 a fixation of the panel 1 is obtained, which resists roughness of the road surface.

The invention is not restricted to the embodiment shown in the drawing by way of example, which can be varied in several ways within the scope of the invention.

I claim:

1. A sliding roof for a vehicle having a fixed roof with a roof opening therein which opening has front and rear edges and spaced lateral sides, comprising:
    a panel having a first forward closed position closing the roof opening and a second rearward, upwardly and rearwardly inclined position, in which the panel partially overlaps the fixed roof, the panel being movable between said first and second positions;
    means defining first and second slots on the lower side of the panel, said slots having surfaces that are generally parallel to the panel and extend in direction from front to rear;
    a latch pin mounted on the means defining and protruding into the second slot adjacent a rearward end of the second slot;
    a front support mounted to be movable backwardly and forwardly in the longitudinal direction of the vehicle and having means for pivotally mounting the panel thereon; and
    a lever disposed rearwardly of the front support, the lever having upper and lower ends and being pivotally supported at its lower end about a transverse pivot axes, the lever having at least first, second and third guide elements formed at the upper end thereof, said first guide element comprising a transverse pin pivotally and slidably engaged in the first slot, and the second guide element being a protrusion formed on an opposite side of the lever from the transverse pin, the protrusion permanently engaging in the second slot as the panel moves between its first and second positions, said second slot extending rearwardly at least as far as the first slot, the protrusion comprising a part circular wall of complemental shape to the latch pin, said part circular wall fitting around said latch pin to prevent rearward movement of the panel relative to the upper end of the lever with the lever in a first lever position when the panel is adjacent its first position, said protrusion moving to a position to release the latch pin for rearward movement of the panel toward its second position when the lever has been pivoted to a second lever position.

2. A sliding roof as claimed in claim 1 wherein the second slot has a rear end wall and the latch pin is positioned at a distance from the rear end wall of the second slot selected so that during the pivoting movement of the lever the part circular wall of the protrusion is fittingly accommodated between the latch pin and the rear wall of the second slot.

3. A sliding roof as claimed in claim 1 wherein the second slot comprises an inlet opening at its lower side at a selected distance from a rear wall of the second slot and being of a size so the third guide element be passed through this inlet opening, the third guide element moving into the inlet opening prior to the time the lever reaches its second position, the front edge of the inlet opening being engaged by the third guide element serving as a stop to prevent rearward movement of the panel relative to the lever when the third guide element moving into the second slot.

4. A sliding roof for a vehicle having a fixed roof with a roof opening therein which has front and rear edges, comprising:

a panel having a first forward closed position closing the roof opening and a second rearward, upwardly and rearwardly inclined position in which the panel partially overlaps the fixed roof, the panel being movable between said first and second positions, said panel having means on the lower side thereof for defining first and second slots extending in direction from front to rear;

a front support mounted to be movable backwardly and forwardly in the longitudinal direction of the vehicle, including a transverse pivot shaft supporting the panel at a front edge thereof;

a lever disposed rearwardly of the front support, the lever having upper and lower ends and being pivotally supported at its lower end about a transverse pivot axis, the lever having at least first, second and third guide elements formed at the upper end thereof for operative coupling to the panel, said first guide element comprising a transverse pin extending from one side of the lever and which is pivotally and slidably engaged in the first slot formed on the lower side of the panel, and the second guide element comprising a protrusion extending from an opposite side of the lever from the transverse pin and lying adjacent thereto, the protrusion being held permanently engaged in the second slot as the panel moves between its first and second positions, said second slot extending in a rearward direction at least as far as the first slot;

latching means mounted on the panel adjacent one end of the second slot and positioned to cooperate with the protrusion so that during pivoting movement of the lever the protrusion is in engagement with the latching means; and a stop defining a position of the lever, in which the protrusion releases from the latching means and the transverse pin starts to move along the first slot, as the panel is displaced toward the second position.

5. A sliding roof as claimed in claim 4 wherein the means defining the first and second slots comprises a U-section, the legs thereof extending downwardly and each leg carrying a plastic section, each of the slots being formed in a respective one of the plastic sections.

6. A sliding roof as claimed in claim 5, wherein the plastic sections have section sides that face each other, the section sides that face each other being spaced apart at the lower portions of the plastic sections, said first and second slots opening to the section sides that face each other and each of said plastic sections having a longitudinal rib on the section sides that face each other, each rib lying above one of the respective first and second slots and comprising a stop for the lever with the panel in its first position.

7. A sliding roof as claimed in claim 4 wherein the lever consists of two portions, which make an angle with respect to each other in a plane in the longitudinal direction of the vehicle, and the lower end of the lever engaging a portion of a member pivotally supporting the lever to comprise a lower stop for defining the second position of the lever.

8. A sliding roof as claimed in claim 4, wherein the latching means comprises a transverse latch pin and the protrusion and latch pin being in alignment to one another during pivoting movement of the lever.

9. A sliding roof as claimed in claim 4, wherein the third guide element comprises a guide cam adapted to be fittingly accommodated in and to cooperate with said second slot when the lever pivots to a position to permit the transverse pin to move along the first slot.

10. A sliding roof as claimed in claim 4 wherein said means defining the first and second slots comprises a downwardly open channel having blocks with the slots defined in said blocks, the blocks being spaced on the lower sides thereof to define a third slot for receiving a portion of the lever therebetween.

* * * * *

UNITED STATES PATENT AND TRADEMARK OFFICE
CERTIFICATE OF CORRECTION

PATENT NO. : 4,678,228

DATED : July 7, 1987

INVENTOR(S) : Robert T. Boots

It is certified that error appears in the above-identified patent and that said Letters Patent is hereby corrected as shown below:

Column 5, line 25, after "element", insert --is--.

Signed and Sealed this

Third Day of November, 1987

Attest:

DONALD J. QUIGG

Attesting Officer

Commissioner of Patents and Trademarks